United States Patent Office 2,874,475
Patented Feb. 24, 1959

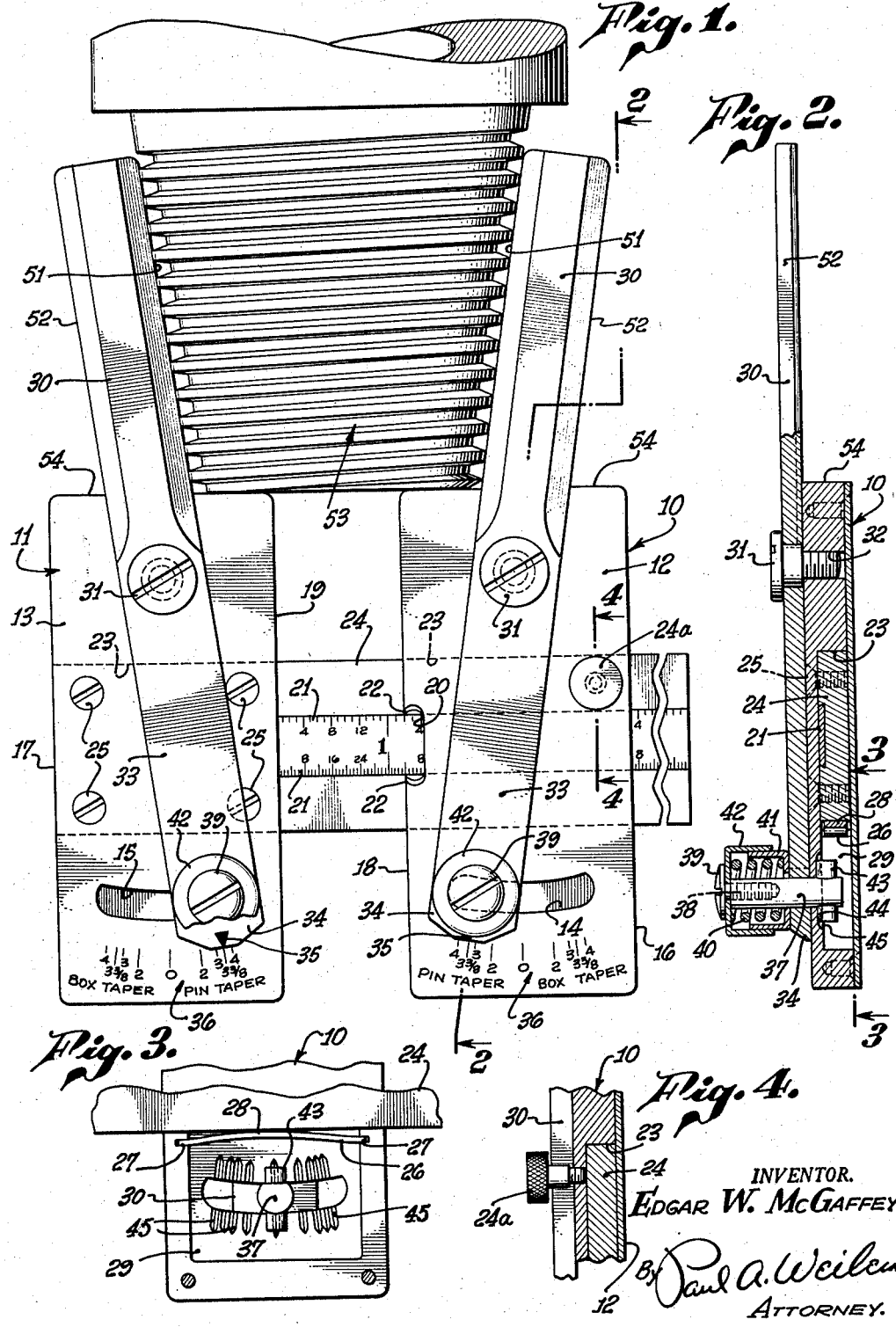

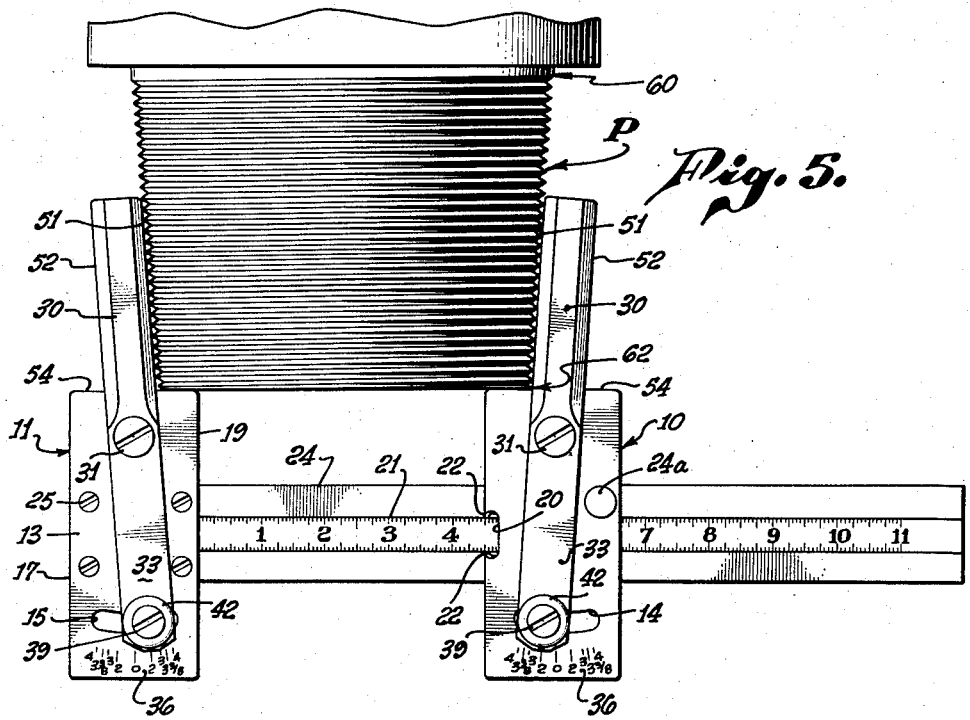
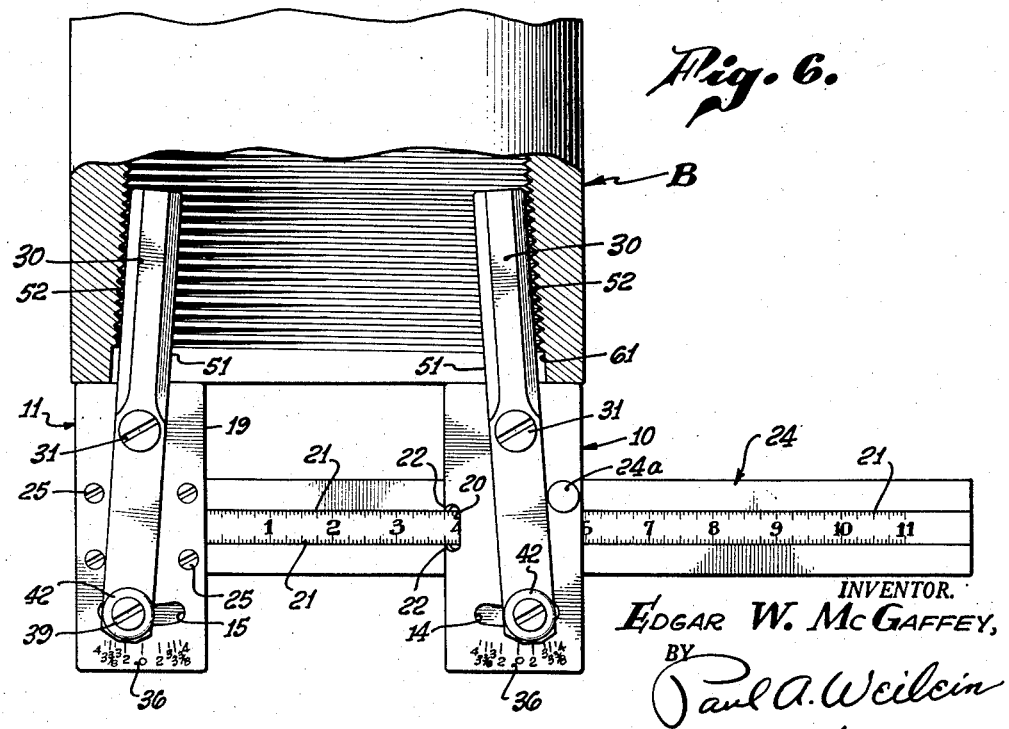

2,874,475

PIPE AND PIPE JOINT GAUGE

Edgar W. McGaffey, Newport Beach, Calif.

Application May 8, 1953, Serial No. 353,832

10 Claims. (Cl. 33—98)

This invention relates to pipe gauges and is particularly concerned with pipe coupling gauges by which the relative dimensions of internal or external pipe joints may be determined.

While this invention is applicable in the gauging of an innumerable variety of pipe couplings and/or pipe end structures, the invention in its present illustrative embodiment provides specifically for the gauging of drill pipe joints, such as in oil well drilling, so that interfitting pipe lengths having uniform coupling or joint characteristcs may be readily selected from a heterogeneous stock of drill pipe having various types of joints or couplings as may be found in warehouses or in the field.

Pipe joints or couplings are in most instances uniform as to base and terminal dimensions as well as taper and length of thread for a given diameter of pipe. Such uniformity, however, does not pertain in drill pipes as used in the petroleum industry. While a similar lack of uniformity may occur in other fields and while the invention may thus be equally efficient and effective in other industries, it is here presented as especially adapted for the selection of uniform oil well drill pipe from a random collection of such pipe, numerous lengths of which may be like in diameter, but have differing joint constructions at their ends.

In considering such joint constructions, it should be borne in mind that the types of drill pipe joints vary materially. Among the categories of such joints are the externally upset, in which the external diameter of the joint portion of the pipe extends outwardly of the normal external surface of the pipe and the internally upset, in which the internal diameter of the joint portion is less than the normal internal diameter of the pipe. Externally upset joints may have an internal diameter equal to the internal diameter of the body of the pipe, forming an internal flush joint, while the internally upset joint may have an external diameter uniform with the external diameter of the body of the pipe to form an external flush joint. Furthermore, in some drill pipe both joint diameters differ from the normal diameters of the pipe, the external being greater while the internal is less. In each of these instances it will be noted that the joint thickness exceeds the pipe wall thickness. The selection of whether such increased thickness be achieved by increase of external diameter, decrease of internal diameter or by both, gives rise to variations in joint dimensions.

In the vernacular of the oil fields, the externally threaded, male joint element tapering outwardly with diminishing external diameter as it extends outwardly from its base juncture with the pipe is commonly known as the pin. The internally threaded, female joint element, tapering inwardly with increasing internal diameter as it extends outwardly from its base juncture with the pipe is commonly known as the box. This "pin" and "box" terminology is referred to in the following description of the invention.

It will be understood that although pipe may be of uniform external diameter, one or more of the pipe joint dimensions vary for each type, while the pin and box dimensions for each type are of corresponding size. Thus, while the pin of each type will properly joint and thread into the box of the same size of the same type of pipe, the pin or box of the pipe of one type and size will not fit with the box or pin of a different type although the external diameter of the pipes may be the same.

From this consideration, it will be obvious that in the selection of pipes of uniform size and type to make up a drill string from a random collection of pipes of varying types, mere selection of size as by inspection or calibration of the pipe body size will not be sufficient. Furthermore, since in some instances the joint dimensions are quite close, selection is not practical by visual inspection of the joint. The present invention provides a gauging instrument by which pipes of a given size and type may be readily selected from a mixed group of pipe.

It is therefore among the more general primary objects of the invention to provide a gauge assisting in the selection of pipe joints of uniform characteristics. Since in the oil well drilling art the drill pipe is conventionally provided with integral joint members, the gauge will be instrumental in the selection of pipe which has uniform joint characteristics.

Similarly, it is a general object of the invention to provide variable settable means adapted to be adjusted to certain characteristics of a pipe joint so that by application to the joints of an indiscriminate group of pipe those having uniform joint characteristics may be discriminated from others having unlike joint structures.

A further general object of the invention is to provide a pipe gauge which is applicable in the selection of pipe of homogeneous character from a heterogeneous mass of pipe independently of the diameter, either internal or external of the body of the pipe.

More specifically, it is an object of the invention to provide settable gauge which when set to uniformly fit a pipe joint of one character will not properly fit a different type of joint even though the diameters of the pipe of which the joints are a part may be the same.

It is also a specific object of the invention to provide a gauge of the character set forth which may be applicable to either the pin or the box of a pipe joint to select uniform interfitting joint elements, either pin or box.

Another object of the invention is to provide a settable gauge of the type referred to which may be readily adjusted and thereafter set to be universally applicable as a gauge for a wide variety of types and sizes of pipe and pipe joints.

Together with the foregoing, it is among the objects of the invention to provide an adjustable gauge universally applicable to a wide variety of pipes and pipe sizes, but which is simple in construction and operation, ruggedly formed to satisfy the requirements of rigorous oil well drilling environments and well adapted to meet the demands of economic manufacture.

Numerous other objects and features of the present invention will be apparent from a consideration of the following specification taken in conjunction with the accompanying drawings, in which:

Fig. 1 is a detailed front elevation of a preferred form of the present invention with the gauge set and applied to the pin of one type of pipe joint;

Fig. 2 is a vertical detailed sectional view taken on the line 2—2 of Fig. 1;

Fig. 3 is a detailed fragmentary section taken on the line 3—3 of Fig. 2;

Fig. 4 is a detailed fragmentary section taken on the line 4—4 of Fig. 1;

Fig. 5 is a view similar to Fig. 1 showing the gauge as set and applied to the pin of a joint dissimilar to that of Fig. 1, although the diameters of the pipes of Figs. 1 and 5 may be the same; and Fig. 6 is a view similar to Fig. 5 showing the gauge as set in Fig. 5 applied to the interfitting box of a joint utilizing the pin of Fig. 5.

In general terms, that form of the invention illustrated in the drawings and described in the following specification as illustrative of one embodiment of the present inventive concept may be defined as including a pair of adjustable interconnected and hence relatively movable blocks upon each of which is mounted, for pivotal adjustment a gauge arm. This arrangement is such that not only may the arms be set at an angle to the blocks and to each other corresponding to the taper of a selected joint pin or box, but by relative movement of the blocks themselves the arms may be set to conform with the particular diameter of the base and outer end of a given pin or box. Thus, the gauge may be set so that the arms will register with and uniformly contact the threads of a box or pin of one type having a certain taper and certain diameters while not registering with and uniformly contacting, hence indicating distinction, with another pin or box having like taper but unlike diameters.

As will be particularly noted from Figs. 5 and 6, the gauging arms are provided with both inner and outer gauging edges so that the device is applicable as a gauge for either the externally threaded pin or the internally threaded box. It will also be noted that the arms may be provided with indicating pointers movable over indicia on the blocks so as to permit setting of the arms to conform with a given type of pin or box by registration of the pointer with an indicia numeral selected from an information table so as to avoid the necessity of setting the gauge originally from one selected pin or box. Thus, though no joint of the type to be selected may be convenient for setting the gauge, it may nevertheless be set in conformity with a predetermined type which may then be easily distinguished from a group of pipe by noting the fit of the gauge thereto.

Similarly, it will be seen that the blocks for supporting the gauge arms are preferably mounted on an indicia bearing plate, at least one of the blocks being slidable thereon so that in adjusting the blocks to conform with a certain pin or box diameter, the calibrations may be resorted to in setting in the manner described with respect to the setting of the arms.

The structure also preferably provides yieldable restraining means for retaining the interconnected blocks against accidental displacement after setting and for assisting in insuring accurate relative location of the elements. More positive frictional locking means may also be provided to positively secure the blocks in adjusted position.

The invention contemplates the use therewith of tables setting forth the proper indicia with which arms or blocks are to be registered for the selection of various types of joint pins or boxes. Such tables may be etched, printed or otherwise applied to some portion of the gauge itself such as the obverse side of the gauge blocks from the sides shown in the drawings. Such tables may be made up by, and the indicia of the gauge may correspond to, accurate and actual measurements of joint characteristics. However, arbitrary symbols, numerical or otherwise, may be used and thus the invention is in no way limited to the type or character of indicia here illustrated. Furthermore, the invention is not limited to the presence of indicia of any sort, since the gauge may be set by conforming it to one selected pin or joint and thereafter applying it at random to similar appearing joints to test the actual conformity thereof to the first selected element.

Referring now to the drawings which depict one practical embodiment of the invention, the numerals 10 and 11 indicate right and left hand gauge blocks respectively. Both blocks are here shown as substantially identical in construction and rectangular in form. Thus, the right hand block 10 is formed with a flat outer face 12 having an arcuate opening 14 therein, a plane outer side edge 16 and a parallel inner side edge 18 formed with an inwardly extending recess 20, the terminal ends of which are curved to provide inwardly directed indicia indicating barbs 22.

In like manner, the left hand block 11 is formed with a flat outer face 13, arcuate opening 15, plane outer side edge 17 and an inner side edge 19. Unlike block 10 however, neither side edge 17 or 19 of the block 11 is formed with a recess forming indicia indicating barbs, since, as will be hereinafter pointed out, the block 11 is not, in this embodiment of the invention, slidably mounted.

The inner faces of the blocks 10 and 11 are formed with transverse recesses 23 accommodating an interconnecting base bar 24. The left hand block 11 is fixedly secured to the base bar 24 by screws 25 extending through the front of the block and into the bar. The right hand block 10 however, is slidable longitudinally of the bar 24, being yieldably guided thereon by a curved leaf spring 26, the ends 27 of which are secured within opposing recesses on the opposite inner longitudinal faces of the recess as seen in Fig. 3. The spring 26, as therein shown, provides a central convex area 28 which rides against an edge of the bar 24 to restrain accidental longitudinal movement of the block 10 on the bar 24.

For positively securing the block 10 in adjusted position, longitudinally of the bar 24, a knurl headed locking screw 24a (see Fig. 4) is threaded through the face of the block to engage the bar.

Below the bar 24 each recess 23 extends to form a chamber 29, the purpose of which will be hereinafter described in connection with the adjustment and securement of the gauge arms. The bar 24 may have indicia inscribed or printed thereon for registration with the barbs 22 to indicate the relative position of the blocks 10 and 11. However, in the form of the invention here presented, a scale 21 is fitted into the front face of the bar 24 whereby the barbs 22 may register with the indicia thereof to indicate the distance of block 10 from the block 11.

Upon each of the gauge blocks 10 and 11 there is pivotally mounted a gauge arm 30. As these arms, their pivotal mounting and their adjustment securing means, are identical, like numerals are used with respect to both of the arms. Each arm 30 is pivotally mounted intermediate its ends to its gauge block by means of a headed pivot pin 31 threadedly engaged in a corresponding threaded aperture 32 of the block. Each arm extends inwardly from the pivot pin 31 forming a shank 33. The inner end 34 of each shank 33 is formed with a pointer 35 adapted to sweep across an arcuate group of scale indicia 36 indicating the angularity of the arm with respect to its block. A further discussion of indicia 36 and the calibrations indicated thereby will be found in the subsequent discussion of the use of the present gauge.

For securing the arms 30 against accidental displacement from an adjusted inclination and for assisting in the accurate location of such arms at a preselected inclination, a bolt 37 extends through each arm 30 adjacent the scale indicia 36. Such bolts 37 further extend through the arcuate openings 14 or 15 so that the pivotal movement of the arms 30 is limited by the extent of the openings. The outer end of each bolt 37 is formed with a threaded pin receiving recess into which is secured a pin 38 having a retaining head 39. Encircling the shank of each bolt outwardly of the arm 30, there is provided a tension spring 40 housed within an inner cup 41 bearing against the arm 30 and an outer cup 42 retained by the head 39 of pin 38 to provide a normal outward spring biasing of the bolt 37. The inner end of each bolt 37 is provided with a locator bar 43 disposed within the chamber 29. Each locator bar 43 is formed with a knife edge 44.

To assist in the location of the arms 30 with their pointers 35 in accurate registration with the individual indicia of the group 36, serrations 45 registering with such indicia are cut, stamped, or otherwise formed on the inner faces of the blocks 10 and 11 within the chambers 29. Thus, engagement of the knife edges 44 within the serrations 45 not only assists in accurately locating the arms but locks the same against accidental movement. Obviously, such engagement is under the influence of springs 40 tending to urge the bolts 37 outwardly. Such resilient biasing however, may be readily overcome by pressure on the heads 39 by which the bolts are forced inwardly, releasing the bars 43 to permit free pivotal movement of the arms for adjustment purposes.

The portions of the arms 30 extending outwardly from the blocks 10 and 11 are formed with inner and outer thread-engaging gauge edges 51 and 52 respectively. As indicated in Fig. 1, when the device is set with the blocks 10 and 11 properly spaced to conform with the end diameter of a joint pin, indicated at 53, and when the arms are angularly adjusted to conform with the taper of such pin, as determined by the relation of thread end diameter to thread base diameter in a given length of the thread, the inner gauge edges 51 will uniformly contact the pin threads. For a pin it will be noted that, as shown in Figs. 1 and 5, the arm angularity is such as to dispose the pointer inwardly of the medial "0" indication of the indicia 36. Thus, such inward indicia is noted as "Pin Taper." Since a corresponding uniform taper must of necessity be incorporated in a corresponding box within which such pin may properly fit, the opposite or outer portion of the indicia 36 beyond the "0" point is indicated as "Box Taper." Since the calibrations on each side of the "0" point are uniform, it will readily be observed (see Fig. 6) that a taper reading of "2" for a pin on the "Pin Taper" scale will dispose the arms in a position angularly equal in divergence to the angle of convergence when the arms are set in the reading "2" of the "Box Taper" scale. In such position the outer gauge edges 52 of the arms will uniformly engage the internal threads of a corresponding box into which the pin may properly be threaded.

As suggested by the foregoing, the blocks may be spaced and the arms angularly separated by fitting the device to a selected pin. For purposes of illustrating the operation of the device, this mode of setting may be assumed to have taken place in the application of the gauge to the pin of Fig. 1. In this use, reference to any indicia in first setting the gauge may be ignored. Assuming the type of pipe or pipe joint to be chosen from a group of mixed pipes or joint has been selected, a convenient pin of the joint of such pipe is located. The sliding gauge block 10 is then released from the bar 24 by loosening locking screw 24a and the block is moved outwardly on the bar away from the block 11. As shown in Fig. 1, the gauge is then applied to the pin 53 so that the ends 54 of the blocks 10 and 11 will abut the outer end of the pin. The left hand arm 30 is then released for pivotal movement by depression of bolt 37 and moved to provide uniform contact of the inner edge 51 thereof with the threads of the pin. With the ends 54 of the blocks 10 and 11 still abutting and disposed in parallelism with the end of the pin 53, the block 10 is moved inwardly toward the block 11 until the inner edge of the right hand arm engages the opposite side of the threads of the pin. The right hand arm is then pivotally moved to uniformly contact the threads. It will be noted of course, that the angular position of the right hand arm when in full contact with threads is identical with that of the arm of the block 11. Thus, if desired, the angular adjustment of the arm of block 10 being ascertainable from that of block 11 in this situation, may be made in advance of sliding the block 10 inwardly toward the block 11 if desired. After adjusting the block 10 the screw 24a may be adjusted to secure the block 10 in location. Arms 30 will be retained in their adjusted positions by engagement of the knife edges 44 in serrations 45 under the influence of springs 40.

With the gauge so adjusted it may then be applied to pin after pin of the mixed group of joints and when the gauge is found to fit a pin, the joint thereof will be known to be uniform with that first selected for the gauge setting and thus uniform pins may be distinguished from other pins not conforming to the one elected. When it is desired to select boxes conforming to the pin by which the gauge has been set, setting of the gauge arms by application to a known conforming box will not be required, since as has been pointed out, a conforming inward taper may be selected by moving the arms so that their points register with identical numerical calibrations on the "Box Taper" scale of the indicia 36.

Turning now to Figs. 5 and 6, the setting of the gauge by predetermined numerical gauge readings may be considered. Assuming the pin P of Fig. 5 conforms with the box B of Fig. 6, the base diameter at 60 of the pin P will equal the end diameter at 61 of the box B. Similarly, the end pin diameter at 62 of the pin P will equal the inner end diameter of the box B. Since the thread lengths are equal the taper of the pin P will be equal but opposite to the taper of the box B. It will be assumed that a chart has been prepared showing the end diameter of pins and boxes of various types of joints and giving the taper angle both in terms of the selected calibration for the block separation scale 21 of Figs. 5 and 6, and the arm angularity scale indicia 36 of these figures. Assuming also that for the joint to be selected the end pin diameter is "4½" on the scale 21 and the taper inclination is "2" on the indicia scale 36, the blocks 10 and 11 will be set so that the barbs 22 of block 10 will register with the reading "4½" on the bar 24. Arms 30 will be set so that their pointers 35 will register with the pin scale inner numeral "2" of calibrations 36. With the gauge so set, the device may be applied to numerous pins and the arms will uniformly contact the pin threads of all joints of the chosen type but will not so contact dissimilar joint pins. Selection of such joint pins is thus easily made.

To select boxes of conforming joints, the arms are set to the "2" of the outer "Box Taper" portion of indicia 36 and the proposed chart is consulted to determine the proper spacing of the blocks 10 and 11 on the bar 24. In this instance, the chart will show the proper spacing for box calibration of this type of joint to be "3¾." The blocks are then set as illustrated in Fig. 6, and the gauge may then be applied to boxes in the manner shown. Boxes of non-uniform joints will not snugly receive the outer edges of the arms in uniform thread contacting manner, as shown in Fig. 6, and thus such boxes will be known as not conforming to the joint selected from the chart.

From the foregoing, it will be seen that the present invention provides a simple, efficient, effective and economical gauge for the selection of pipe joints and particularly for the selection of jointed drill pipe having uniform joints from a group of pipe having like diameters but dissimilar joints. It will of course be understood that while one specific and preferred embodiment of the invention is here shown, numerous changes, modifications and the full use of equivalents may be resorted to in the practice of the invention without departure from the spirit or scope thereof as outlined in the appended claims.

I claim:

1. A pipe and pipe joint gauge including: a pair of relatively movable gauge blocks; a scale interconnecting said blocks with respect to which at least one of said blocks may move to provide relative movement between said blocks; a pair of opposed gauge arms extending from said blocks pivotally mounted thereon for relative angular adjustment; at least one of said blocks having at one end a straight edge disposed in outwardly spaced parallel relation to said scale and extending across and laterally beyond opposite side edges of the associated gauge arm to provide a pair of stop shoulders either of which is engageable with a pipe or pipe joint member to be gauged.

2. A gauge for pipe and pipe joints including: a scale; a gauge block secured to said scale; a gauge block slidable on said scale with respect to said first mentioned block; a gauge arm pivotally mounted intermediate its ends on said first mentioned block; and another gauge arm pivotally mounted intermediate its ends on said second mentioned block for cooperation with the first mentioned gauge arm; each of said blocks having at one end a straight edge disposed in outwardly spaced parallel relation to said scale and extending across and laterally beyond opposite edges of the associated gauge arm to provide stop shoulders between said arms as well as outside the space between said arms.

3. In a gauge: a scale having calibration indicia thereon; a gauge block secured to said scale; a gauge block having a barb registrable with the indicia of said scale slidable on said scale with respect to said first mentioned block; a gauge arm pivotally mounted on said first mentioned block; cooperable means on said block and said arm respectively for indicating the relative angularity of said arm and said block; an opposed cooperating gauge arm pivotally mounted on said second mentioned block; and means on said second mentioned block and said second mentioned arm respectively cooperable to indicate the relative angularity thereof with respect to said block; said blocks having straight edges extending across said arms and laterally past opposite edges of said arms to form a pair of stop shoulders between said arms as well as a pair of stop shoulders outside the space between said arms.

4. A drill pipe joint gauge including: a pair of gauge blocks having planar end surfaces for contacting the end of said drill pipe joint; means including a scale to which one of said blocks is fixed interconnecting said gauge blocks to permit relative bodily movement thereof; means on the other block cooperating with said scale for indicating the relative spacing of said blocks; means releasably retaining said other block in adjusted position on said scale relative to said fixed block; an arm pivotally mounted on each of said blocks; said arms having portions extending outwardly from said end surfaces; each arm having a pair of gauge edges extending longitudinally of said portions; the planar end surface of each block being disposed in spaced parallel relation to said scale and having a portion extending laterally outwardly from each gauge edge of each of said arms; and means for releasably holding said arms in angularly adjusted position.

5. In a gauge for pipe and pipe joints: a gauge arm; a member on which said arm is pivoted; said member having a surface provided with an arcuate opening therein over which a portion of said arm travels; and a bolt extending from said arm through said opening; said bolt having a cross arm thereon releasably engageable with the underside of said surface; and spring means urging said bolt in a direction to engage said cross arm with said underside of said surface; said member having scale indicia on said surface adjacent said portion of said arm; said underside of said surface having serrations registering with said indicia; said cross arm being engageable in said serrations.

6. In a gauge for pipe and pipe joints: a gauge arm; a member on which said arm is pivoted; said member having a surface provided with an arcuate opening therein over which a portion of said arm travels; and a bolt extending from said arm through said opening; said bolt having a cross arm thereon releasably engageable with the underside of said surface; spring means urging said bolt in a direction to engage said cross arm with said underside of said surface; said underside of said surface having serrations; and a knife edge on said cross arm engageable in said serrations.

7. In a gauge for the pins and boxes of oil well drill pipes: a pair of members having planar surfaces for contacting the outer end of a pin or box to be gauged; means mounting said members in opposed relation to one another for relative movement to vary the spacing of said members one from the other; a gauge arm pivoted on each of said members; said arms having portions extended outwardly from said surfaces with opposite edges of said portions disposed for optionally contacting the exterior of a pin to be gauged or the interior of a box to be gauged said mounting means being laterally offset from said surfaces whereby said surfaces may be engaged with said pin or box while the pin or box is laterally outwardly spaced from said mounting means; said surfaces extending transversely across said arms beyond said opposite edges for engaging said pin when the latter is between said arms and for engaging said box when said arms are within said box.

8. In a gauge for the pins and boxes of oil well drill pipes: a pair of members having planar surfaces for contacting the outer end of a pin or box to be gauged; means mounting said members in opposed relation to one another for relative movement to vary the spacing of said members one from the other; a gauge arm pivoted on each of said members; said arms having portions extended outwardly from said surfaces with opposite edges of said portions disposed for optionally contacting the exterior of a pin to be gauged or the interior of a box to be gauged; and means on one of said members and said mounting means respectively cooperable to indicate the spacing of said members said surfaces extending transversely across said arms at points laterally outwardly spaced from said mounting means; said surfaces extending laterally from said opposite edges.

9. In a gauge for the pins and boxes of oil well drill pipes: a pair of members having planar surfaces for contacting the outer end of a pin or box to be gauged; means mounting said members in opposed relation to one another for relative movement to vary the spacing of said members one from the other; a gauge arm pivoted on each of said members; said arms having portions extended outwardly from said surfaces with opposite edges of said portions disposed for optionally contacting the exterior of a pin to be gauged or the interior of a box to be gauged; means on one of said members and said mounting means respectively cooperable to indicate the spacing of said members; and means on said arms and said mounting means respectively, cooperable to indicate the relative angularity of said arms said surfaces extending transversely across said arms at points laterally outwardly spaced from said mounting means; said surfaces extending laterally from said opposite edges.

10. In a gauge for the pins and boxes of oil well drill pipes: a pair of elongated members each having at one end a surface normal thereto for contacting the outer end of a pin or box to be gauged; means mounting said members in opposed relation to one another for relative movement to vary the spacing of said members one from the other; a gauge arm pivoted on each of said members; said arms being relatively angularly movable about their pivots and having portions extended outwardly from said surfaces; said portions having inner and outer longitudinal edges disposed to lie against the outer surface of a pin and the inner surface of a box, respectively; means for releasably holding said members against relative movement; and means for releasably holding said arms against relative movement about their pivots said surfaces extending transversely across said arms at points laterally outwardly spaced from said mounting means; said surfaces extending laterally from said opposite edges.

References Cited in the file of this patent

UNITED STATES PATENTS

| | | | |
|---|---|---|---|
| 364,630 | Bowyer | | June 14, 1887 |
| 386,033 | Reeves | | July 10, 1888 |
| 482,888 | Fox | | Sept. 20, 1892 |
| 572,106 | Essick | | Dec. 1, 1896 |
| 713,255 | Traut | | Nov. 11, 1902 |
| 933,655 | Manges | | Sept. 7, 1909 |
| 1,414,033 | Mahon | | Apr. 25, 1922 |
| 1,549,271 | Larson | | Aug. 11, 1925 |
| 2,003,626 | Bozzer | | June 4, 1935 |
| 2,054,503 | Jambura | | Sept. 15, 1936 |
| 2,678,498 | Rimmel | | May 18, 1954 |